United States Patent Office 3,527,104
Patented Sept. 8, 1970

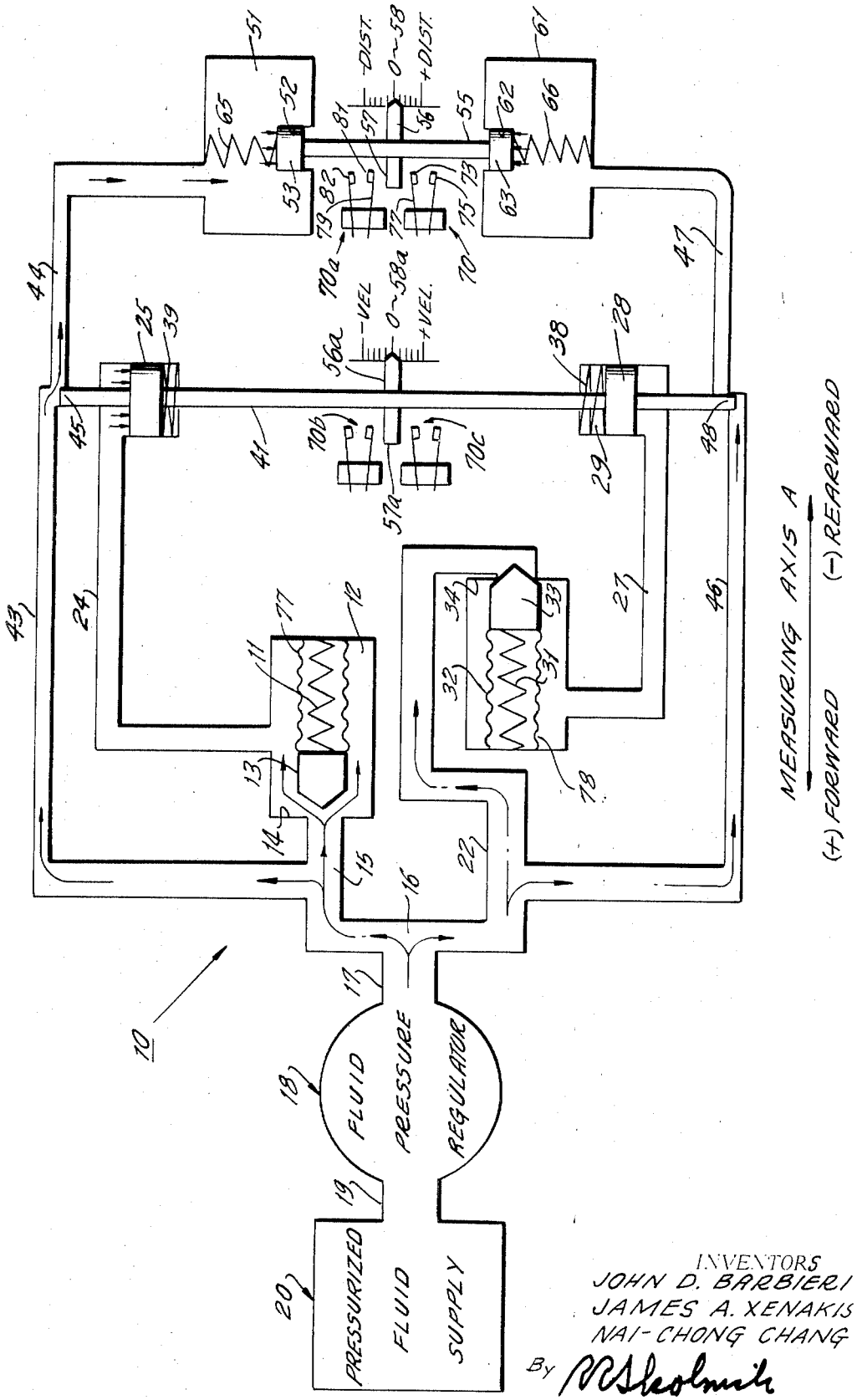

3,527,104
VELOCITY AND DISTANCE MEASURING DEVICE
John D. Barbieri, Howard Beach, James A. Xenakis, Woodside, and Nai-Chong Chang, Scarsdale, N.Y., assignors to Sperry Rand Corporation, a corporation of Delaware
Filed Oct. 24, 1966, Ser. No. 588,973
Int. Cl. G01p *15/04*
U.S. Cl. 73—490    10 Claims

ABSTRACT OF THE DISCLOSURE

A fluid operated velocity and distance measuring device is constructed with normally closed acceleration sensitive valves to control fluid pressure which operates a velocity output device. Fluid under pressure is admitted into a storage chamber in a manner controlled by the velocity output device, with fluid accumulation in the storage chamber being related to total distance travelled. For improved speed of response and accuracy, the pressure ratio across each of the acceleration sensitive valves is maintained at a level which results in sonic flow through such valves.

---

In general, this invention relates to velocity and distance measuring devices which utilize acceleration detecting elements. More particularly, this invention relates to devices of this type that are fluid operated and will produce fluid pressure outputs related to velocity and distance.

Prior art devices for providing accurate velocity and/or distance traveled outputs often produce an accelerometer output which is integrated once to obtain velocity and integrated a second time to obtain distance traveled. The accelerometers used are generally force restored, pendulous devices or open loop spring mass systems having capacitive type pickoffs. The prior art has also utilized velocity detectors for producing an output which is then integrated to provide distance traveled. Velocity detectors which have been used by the prior art are for the most part devices including vibrating string accelerometers, pendulous integrating gyroscopic accelerometers and force re-balance type units. This latter group of acceleration detectors provide a pulse frequency output proportional to acceleration with velocity being obtained by counting the total number of pulses.

A rotating helix type accelerometer has also been utilized. This produces an output related to distance traveled by providing a servo follow-up mechanism to restore a screw-nut unit to a zero position with the total revolutions of the follow-up mechanism being related to total distance traveled.

The foregoing prior art devices, as well as other prior art devices for producing velocity and distance traveled outputs, have certain disadvantages that are not present in the fluid operated device constituitng the instant invention. In particular, prior art devices require electrical power, are radiation sensitive and/or require complex components for electrical and/or mechanical integrations.

The fluid operated device of the instant invention provides a velocity output by utilizing normally closed acceleration sensitive valves to control fluid pressure acting on a velocity output device. In turn, the velocity output device controls operation of a valve for admitting fluid under pressure into a storage chamber with the fluid pressure or accumulation in the storage chamber being related to total distance traveled.

Accordingly, a primary object of the instant invention is to provide novel fluid operated means for deriving velocity and/or distance traveled related outputs.

Still another object is to provide a device of this type that does not require electrical power for operation.

Still another object is to provide a device of this type which is of relatively low cost and is very reliable.

A further object is to provide a device of this type which is insensitive to radiation.

A still further object is to provide a device of this type which does not require electrical or mechanical integrators.

These, as well as other objects of this invention, will become readily apparent after reading the following description of the accompanying drawing in which the single figure is a schematic diagram of a velocity and distance measuring device constructed in accordance with the teachings of the instant invention.

Now referring to the figure. Velocity and distance measuring apparatus 10 is mounted to a vehicle frame (not shown) with the longitudinal axes of coiled compression springs 11, 31 parallel to measuring axis A. Spring 11 is disposed within valve chamber 12 and normally biases acceleration sensing tapered valve member 13 against orifice seat 14 at the left end of chamber 12. Sealing bellows 77 prevents pressure buildups in chamber 12 from affecting the action of the tapered valve member 13 against seat 14. Fluid conduit or passage section 15 extends from the central portion of seat 14 through fluid conduit section 16 to exit 17 of fluid pressure regulator 18. Entrance 19 to regulator 18 is connected to pressurized fluid supply 20. Under conditions of zero acceleration the force of spring 11 is sufficient to drive tapered valve member 13 firmly against seat 14 against the force of fluid exiting from pressure regulator 18.

Fluid conduit section 16 is connected through fluid conduit section 22 to the end of valve chamber 32 having orifice seat 34 at the right end thereof. Coiled spring 31 biases acceleration sensing tapered valve member 33 rearward, parallel to the measuring axis A toward firm engagement with seat 34. Sealing bellows 78 prevents pressure buildups in chamber 32 from affecting the action of tapered valve member 33 against seat 34.

Fluid conduit section 24 connects valve chamber 12 to the upper end of cylinder 26 having piston 25 closely fitted to the internal wall thereof. Similarly, fluid conduit section 27 connects valve chamber 32 to the lower end of cylinder 29 having piston 28 closely fitted therein.

Pistons 25 and 28 are fixedly mounted to elongated output rod 41 in axially spaced relationship. The end 45 of rod 41 extending above piston 25 constitutes a movable valve member for controlling the size of opening between fluid conduit sections 43, 44. Similarly, the end 48 of rod 41 extending below piston 28 constitutes a valve member controlling the size of opening between fluid conduit sections 46 and 47. Fluid conduit section 43 extends from valve portion 45 through conduit sections 15, 16 and through the exit 17 of pressure regulator 18 while fluid conduit section 46 extends from valve 48 through conduit sections 22 and 16 to exit 17 of pressure regulator 18. Compression spring 39 at the bottom of cylinder 26 biases piston 25 upwardly while compression spring 38 at the top of cylinder 29 biases piston 28 downwardly. As will hereinafter be explained, the forces of springs 38 and 39 act in opposite directions to center rod 41 during conditions of zero velocity to block the fluid connection between conduits 43, 44 and the fluid connection between conduits 46, 47.

Fluid conduit 44 extends from valve 45 to fluid accumulating chamber 51 while fluid conduit section 47 extends from valve 48 to accumulating chamber 61. One wall of chamber 51 is formed with internal cylinder 52 while one wall of chamber 61 is formed with internal cylinder 62 opposite and aligned with cylinder 52. Pistons 53, 63 are closely fitted to the internal walls of the respective cylinders 52, 62 and are secured to opposite ends of connecting rod 55. The latter carries a transverse element having an indicator portion 56 at one end and a switch operator portion 57 at the other end. Operator 57 is mounted for operating switch 70 by engaging spring arm 71 carrying contact 73. Upon sufficient downward movement of rod 55 operator 57 deflects arm 71 so that contact 73 engages contact 75 of switch 70. When rod 55 moves upwards the operator 57 deflects arm 79 of switch 70a so that contact 81 engages contact 82 of switch 70a. Indicator arm 56 is positioned adjacent to piston readout scale 58 for a visual reading of distance traveled.

Compression spring 65 in chamber 51 biases piston 53 downwardly and spring 66 in chamber 61 biases piston 63 upwardly.

Rod 41 carries a member having pointer 56a and switch operator 57a. Pointer 56a is positioned adjacent velocity scale 58a to provide a visual indication of instantaneous velocity. Operator 57a is engageable with switches 70b and 70c for operation thereof under predetermined conditions of negative and positive velocities, respectively Operation of apparatus 10 is as follows. With the vehicle in question at rest and indicator 56 set at zero, fluid from supply 20 after passing through pressure regulator 18 is distributed to acceleration sensing valve members 13, 33 and to velocity controlled valve members 45, 48. An acceleration of apparatus 10 in the forward direction along measuring axis A causes acceleration sensing valve 13 to move rearward of seat 14 as shown, thereby permitting fluid to enter valve chamber 12. The fluid mass flowing into chamber 12 is maintained proportional to acceleration since tapered valve member 13 and orifice seat 14 are so proportioned that the exposed valve area increases linearly with input acceleration. In addition the pressure ratio across member 13 is maintained by regulator 18 at values less than 0.53 under essentially constant temperature conditions to assure constant sonic velocities. Pressure regulator 18 maintains a constant pressure to exit 17 assuring constant fluid density.

Fluid entering chamber 12 passes through conduit section 24 and acts against the upper end of piston 25 to urge rod 41 downward thereby moving valve 45 to open the conection betwen conduit sections 43, 44 and connect chamber 51 to the output of presure regulator 18. As fluid accumulates in chamber 51 pressure therein increases and acts upon piston 53 to drive rod 55 downward to an extent proportional to distance traveled. The rate of fluid flow into chamber 51 is related to the position of rod 41 in a manner proportional to velocity due to the same fluid considerations previously described for flow into chamber 12.

When acceleration in the forward direction ceases the pressure within chamber 12 is maintained at a constant value so that valve 45 remains open and fluid flow into forward distance chamber 51 continues.

Upon the occurrence of a rearward acceleration along measuring axis A sensing valve 33 moves away from seat 34 permitting fluid flow from condiut section 22 into chamber 32. The pressure within chamber 32 acts on the lower surface of piston 28 tending to drive rod 41 upward. As pressure within chamber 32 increases and pressure within chamber 12 remains constant, rod 41 begins to move upward closing the connection between conduit sections 43, 44 and decreasing fluid flow into forward disatnce chamber 51. When pressure within chamber 32 exceed pressure within chamber 12, valve 48 opens the connection between conduit sections 46 and 47 and fluid flows into rearward distance chamber 61. The position of rod 55 is proportional to the difference between the pressures accumulating in chambers 51 and 61. Now fluid flows into chamber 61.

If it is only required to detect unidirectional acceleration the entire rearward channel may be eliminated and if only velocity is to be detected then conduit sections 43, 46 may be eliminated together with those fluid elements supplied and/or operated thereby.

It should now be obvious that closure of switches 70, 70a, 70b and 70c may be used to actuate control elements (not shown). The velocity or distance at which closure of switches 70, 70a, 70b and 70c occurs can be adjusted by moving the position of the switches relative to operators 57 and 57a.

Although there has ben descirbed a preferred embodiment of this novel invention, many variations and modifications will no wbe aparent to those skilled in the art. Therefore, this invention is to be limited, not by the specific disclosure herein, but only by the appending claims.

What we claim is:

1. A device for detecting velocity along a measuring axis, said device including a source of fluid under pressure, a fluid pressure sensing means including an output means mounted for movement related to fluid pressure applied to said pressure sensing means, first means defining a first fluid passage between said source and said pressure sensing means, valve means including a first portion, acceleration sensing means for opening said first portion when said device is subjected to a forward acceleration along said measuring axis, said first portion connected in and normally closing said first passage at a first location thereof intermediate said source and said pressure sensing means whereby said output means assumes a position related to pressure in said passage between said valve means and said pressure sensing means, and fluid pressure regulator means interposed between said source and said first passage for maintaining fluid pressures across said first portion at a ratio which will result in sonic velocity fluid flow at said first portion when said first portion is open.

2. A device as set forth in claim 1 in which there is a second means defining a second fluid passage between said source and said pressure sensing means, said valve means also including a second portion which is opened by said acceleration sensing means when said device is subjected to a rearward acceleration along said measuring axis, said second portion connected in and normally closing said second passage at a second location intermediate said source and said pressure sensing means, said passages connected to said pressure sensing means at different locations thereof with fluid pressures directed through said passages exerting opposing forces on said pressure sensing means whereby said output means assumes a position related to pressures in said passages between said valve means and said pressure sensing means, and means maintaining fluid pressures across said second portion at a ratio which will result in sonic velocity fluid flow at said second portion when said second portion is open.

3. A device as set forth in claim 2 in which said first portion includes a part biased forward along said measuring axis to close said first portion when said device is not subjected to a forward acceleration and in which said second portion includes a part biased rearward along said measuring axis to close said second portion when said device is not subjected to a rearward acceleration, and means mounting said parts for linear movement under predetermined conditions of acceleration.

4. A device as set forth in claim 3 in which said first portion opens said first passage by an amount that increases as forward acceleration along said measuring axis increases and said second portion opens said second passage by an amount that increases as rearward acceleration along said measuring axis increases.

5. A device as set forth in claim 2 also including additional means for measuring forward distance traveled by said device along said axis, said additional means including a pressure responsive output device, a third means defining a third fluid passage betwen said source and said pressure responsive output device, a valve member operable by said working member, said valve member connected in and closing said third fluid passage when there are equal pressures in said first and said second passages between said valve means and said pressure sensing means, said output means operating said valve member to open said third fluid passage when pressure in said first passage acting on said pressure sensing means exceeds pressure in said second passage acting on said pressure sensing means.

6. A device as set forth in claim 5 in which said valve member opens said third fluid passage by an amount that increases as the difference between fluid pressure in said first fluid passage acting on said pressure sensing means increases over fluid pressure in said second fluid passage acting on said pressure sensing means.

7. A device as set forth in claim 3 also including further means responsive to rearward distance traveled by said device along said measuring axis, said further means including a fourth means defining a fourth fluid passage between said source and said pressure responsive output device, a further valve member operable by said working member, said further valve member connected in and closing said fourth fluid passage when there are equal pressures in said first and said second passages between said valve means and said pressure sensing means, said working member operating said further valve member to open said fourth passage when pressure in said second passage acting on said pressure sensing means exceeds pressure in said first passage acting on said pressure sensing means whereby said pressure responsive output device assumes a position related to pressures in said third and said fourth passages between said valve members and said output device.

8. A device as set forth in claim 7 in which said valve member opens said third fluid passage by an amount that increases as the difference between fluid pressure in said first fluid passage acting on said pressure sensing means increases over fluid pressure in said second fluid passage acting on said pressure sensing means, said valve member opening said fourth fluid passage by an amount that increases as the difference between fluid pressure in said second fluid passage acting on said pressure sensing means increases over fluid pressure in said first fluid passage acting on said pressure sensing means.

9. A device as set forth in claim 8 in which said first portion opens said first passage by an amount that increases as forward acceleration along said measuring axis increases and said second portion opens said second passage by an amount that increases as rearward acceleration along said measuring axis increases.

10. A device as set forth in claim 9 in which said fluid pressure sensing means includes a biasing means urging said output means to a centered position wherein said first and said second portions close the respective first and second fluid passages.

References Cited

UNITED STATES PATENTS

| | | | |
|---|---|---|---|
| 1,728,904 | 9/1929 | Herr | 73—490 |
| 2,338,536 | 1/1944 | Plaut-Carcasson | 73—503 |
| 2,659,589 | 11/1953 | Hickman | 73—490 |
| 3,263,505 | 8/1966 | Grunwald | 73—515 |

OTHER REFERENCES

Pao, Richard: "Fluid Mechanics," published by John Wiley and Sons, pp. 340–345.

JAMES J. GILL, Primary Examiner

H. GOLDSTEIN, Assistant Examiner

U.S. Cl. X.R.

73—503